P. Robinson.
Street Sweeper.
Nº 3,183. Patented Jul. 20, 1843.

UNITED STATES PATENT OFFICE.

PLINY ROBINSON, OF LEONARDSVILLE, NEW YORK.

IMPROVEMENT IN MACHINES FOR SWEEPING STREETS.

Specification forming part of Letters Patent No. 3,183, dated July 20, 1843.

*To all whom it may concern:*

Be it known that I, PLINY ROBINSON, of Leonardsville, in the county of Madison and State of New York, have invented a new and useful Improvement in Sweeping Streets; and I do hereby declare that the following is a full, clear, and exact description thereof, reference being had to the accompanying drawings, making a part of this specification, in which—

Figure 1:
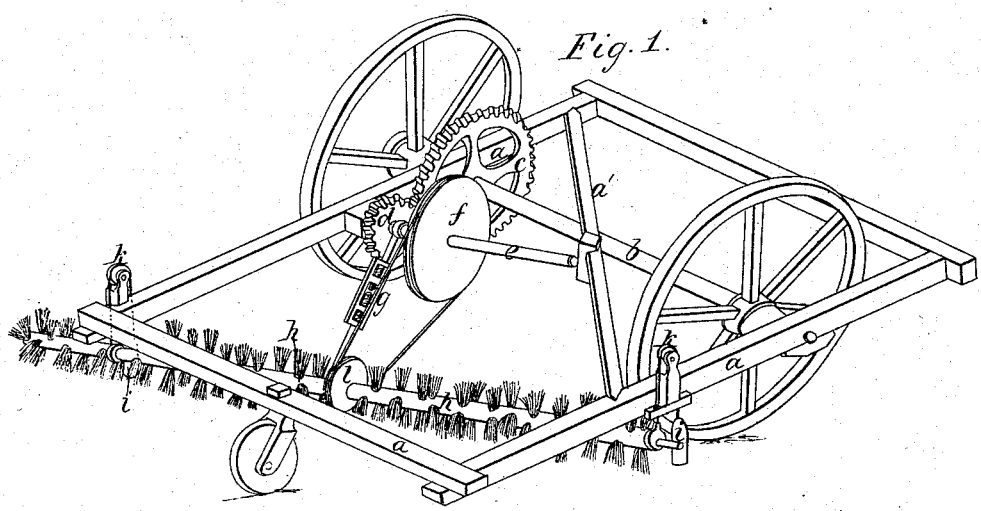
Figures 2, 3:
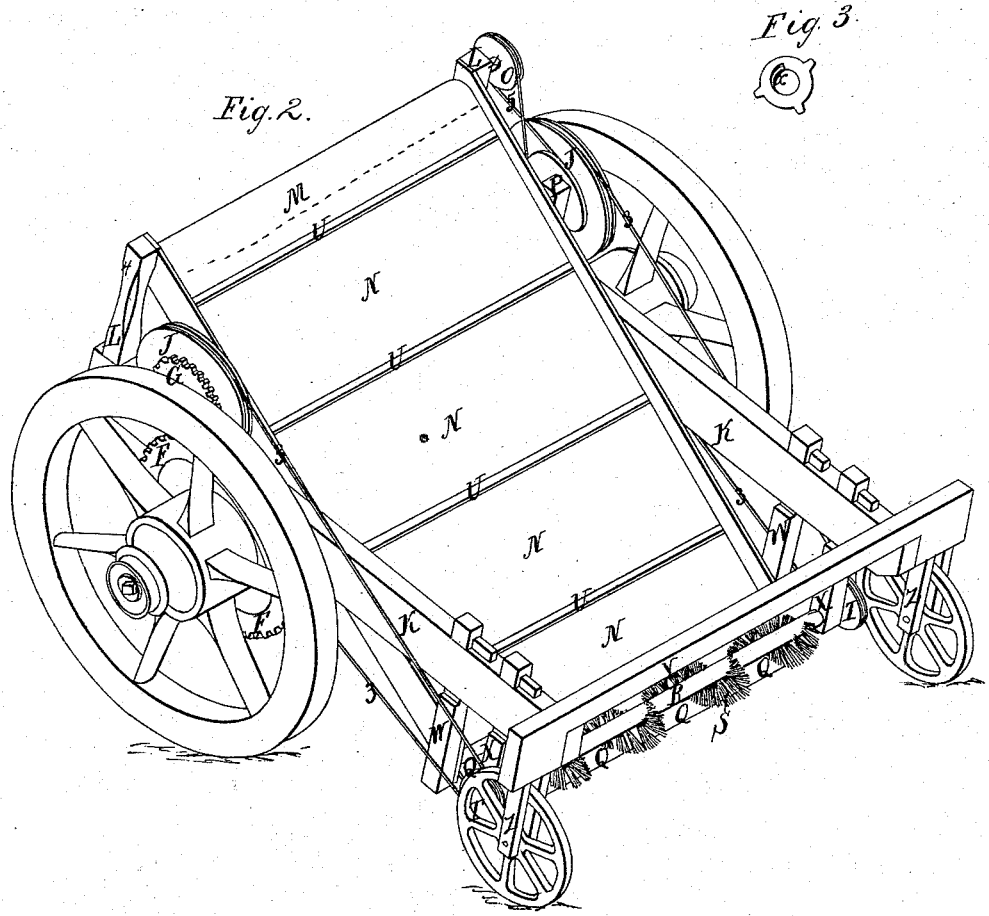

Figure 1 is a perspective view of the apparatus for sweeping streets, &c.; Fig. 2, the loading apparatus; Fig. 3, the hub and axle detached.

The nature of my invention consists in the employment of a revolving oblique brush attached to a frame drawn by horse or other power for sweeping streets and other similar purposes and loading the dirt into carts.

That part of the apparatus for sweeping streets, &c., I construct with a rectangular frame $a$, composed of four pieces of the proper size and dimensions for the purpose required. Near the forward end it rests on an axle $b$, and is attached thereto by boxes, in which the axle turns. On this axle two wheels are put, which can be connected with the axle and turn it in a manner hereinafter described.

Just inside the frame there is a bevel-wheel $c$ on the axle, which meshes into a bevel-pinion $d$ on a short axle $e$, that stands obliquely in the frame. One end of this axle rests in a step in the side of the frame, the other in a cross-brace $a'$ of the frame at right angles to the axle. On the axle $e$ there is also a pulley $f$, and between this pulley and the pinion the upper end of an arm $g$ embraces the axle. This arm extends down to a revolving brush $h$ behind. The brush is composed of a shaft surrounded spirally or otherwise by any proper material for brushing which is elastic and will answer the purpose of sweeping up the dirt. The brush so constructed is placed parallel with the axle $e$ under the hind end of the frame, and is sustained in its position by the arm $g$. It rests on the ground with a pressure that is regulated by means of a weight $i$, attached to a cord that passes up over a pulley $k$ in the frame and down to the brush at each end. The weights serve to properly counterbalance the brush. On one side of the arm there is a pulley $l$, attached to the shaft of the brush on a line with the pulley $f$ on axle $e$. These pulleys are connected by an endless band, by which means motion is communicated from the axle $b$ to the brush in a contrary direction to the motion of the wheels of the carriage. The arm $g$ for holding the brush can be made with a link and screw for lengthening it in the usual way of lengthening bars, if desired.

A small wheel $m$, made to turn like a caster, can be attached to the hind end of the frame, if necessary.

The method I employ for connecting the wheels with the axle is more clearly shown in Fig. 3. That part of the axle on which the hub turns has one or more recesses on its sides, in which is inserted a click $x$, which is made to spring outward. The box in the hub has a triangular groove cut its whole length, with a square shoulder on one side, against which the click strikes when the hub turns in one direction, and thus forces the axle to turn with it. If the hub turns back, the click is borne down flush with the axle, which then ceases to turn.

The modification for loading a cart has a frame and wheels and axle similar to that above described. On the axle is a spur-wheel F, Fig. 2, instead of the bevel-wheel. This meshes into a pinion G, set parallel with the side of the frame on a stud, and carries a pulley J, which is connected by a band 3 with a pulley T on the end of the brush R, set parallel with the end of the frame and supported by pieces X, projecting down from the frame. There are also two pins W extending down just before those lettered X. In these the gudgeons of a roller Q turn, which supports the lower end of a revolving apron N. This apron is supported above at the forward end of the frame and at the proper height by a roller M, having its bearings in upright posts L on the front end of the frame. On one of the gudgeons of the roller M there is a pulley O, by which the roller and apron are turned by means of a band passing over a pulley P, connected with another pulley J, which is connected by a band with a pulley on the end of the brush opposite that which connects the brush with the prime mover. The apron N may have cleats U attached to it at proper distances to aid in carrying up the dirt.

I do not claim simply the combination of a rotary brush with a carriage for sweeping, as this has been done; but

What I claim as my invention, and desire to secure by Letters Patent, is—

The combination of the oblique-revolving brush $b$ with a carriage for sweeping streets, &c., the motion of the brush being taken from the wheels of said carriage, constructed and arranged in the manner and for the purpose herein set forth.

PLINY ROBINSON.

Witnesses:
ORVILLE ROBINSON,
J. J. GREENOUGH.